United States Patent
Kurashina (10) Patent No.: US 8,589,144 B2
(45) Date of Patent: Nov. 19, 2013

(54) CHARACTER PROCESSING DEVICE, CHARACTER DISTINCTION METHOD AND COMPUTER PROGRAM

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1236 days.

(21) Appl. No.: 12/210,840

(22) Filed: Sep. 15, 2008

(65) Prior Publication Data

US 2009/0138256 A1    May 28, 2009

(30) Foreign Application Priority Data

Nov. 27, 2007    (JP) .................... 2007-305486

(51) Int. Cl.
*G06F 17/22*    (2006.01)

(52) U.S. Cl.
USPC .................... 704/2; 704/7; 715/257

(58) Field of Classification Search
USPC .......................... 704/2, 7; 715/257
See application file for complete search history.

(56) References Cited

U.S. PATENT DOCUMENTS

| 5,623,682 | A | 4/1997 | Fukunaga |
| 5,634,066 | A | 5/1997 | Takehara et al. |
| 7,715,882 | B2 * | 5/2010 | Oda et al. ............... 455/566 |
| 7,802,184 | B1 * | 9/2010 | Battilana ............... 715/257 |

FOREIGN PATENT DOCUMENTS

| EP | 0930559 A1 * | 7/1999 |
| JP | 05012287 A | 1/1993 |
| JP | 06139228 A | 5/1994 |
| JP | 11-203032 | 7/1999 |

* cited by examiner

*Primary Examiner* — Vincent P Harper
(74) *Attorney, Agent, or Firm* — DLA Piper LLP (US)

(57) ABSTRACT

Provided herein is a character processing device that converts an input character formed of an input alphanumeric or symbol to an extended Latin character similar to the input character including: a display unit displaying as an editing character the input character with a cursor attached thereto; a conversion target distinction unit discerning whether or not the editing character is convertible to the extended Latin character; and a notification unit indicating that the editing character is convertible to the extended Latin character when the editing character is regarded as convertible.

8 Claims, 7 Drawing Sheets

| CHARACTERS SUBJECT TO CONVERSION | A, C, D, E, I, N, O, U, Y a, c, d, e, i, n, o, u, y, s ?, ! | 71 |
| --- | --- | --- |
| CHARACTERS EXEMPT FROM CONVERSION | ALL CHARACTERS BUT CHARACTERS SUBJECT TO CONVERSION | 72 |

FIG. 7B

| CHARACTERS SUBJECT TO CONVERSION | EXTENDED LATIN CHARACTERS | | | | | |
| --- | --- | --- | --- | --- | --- | --- |
| A | Á | À | Ä | Â | Å | Ã |
| E | É | È | Ë | Ê | Ø | Œ |
| U | Ú | Ù | Ü | Û | | |
| ⋮ | ⋮ | ⋮ | ⋮ | ⋮ | ⋮ | ⋮ |
| a | á | à | ä | â | å | ã | ª |
| e | é | è | ë | ê | œ | | |
| u | ú | ù | ü | û | | | |
| ⋮ | ⋮ | ⋮ | ⋮ | ⋮ | ⋮ | ⋮ | ⋮ |
| ? | ¿ | | | | | |
| ! | ¡ | | | | | |

CHARACTER PROCESSING DEVICE, CHARACTER DISTINCTION METHOD AND COMPUTER PROGRAM

The entire disclosure of Japanese Patent Application No. 2007-305486, filed on Nov. 27, 2007, is expressly incorporated by reference herein.

BACKGROUND

1. Technical Field

The present invention relates to a character processing device, character distinction method and computer program for converting input characters to extended Latin characters.

2. Related Art

Character processing devices that are capable of converting input alphabetical characters (standard alphabetical characters) to corresponding extended Latin characters (non-standard alphabetical characters) have been generally known. In such a character processing device, after an alphabetical character is input and a conversion button is pressed by a user, conversion candidates for extended Latin characters related (similar) thereto are displayed. From the conversion candidates, the user selects a desirable extended Latin character. As described in JP-A-11-203032, for example, with the conversion button pressed after the input of an alphabetical character "e," extended Latin characters similar to "e" are displayed; and therefrom a desirable extended Latin character (e.g., "ë") is selected.

In the conversion to extended Latin characters mentioned above, unlike in the kana-to-kanji conversion made using the Roman character input, not all input alphabetical characters are subject to conversion. In the above character processing device, however, both alphabetical characters convertible and inconvertible to extended Latin characters are displayed without distinction. Accordingly, users who are well acquainted with extended Latin characters have no difficulty using such a device (converting to extended Latin characters) because they know what alphabetical characters are convertible to extended Latin characters, but users who are not familiar with extended Latin characters have difficulty discerning whether an input alphabetical character is convertible to an extended Latin character.

SUMMARY

An advantage of some aspects of the invention is to provide a character processing device, character distinction method and computer program for making it easy to discern whether a character subject to editing is convertible to an extended Latin character.

According to one aspect of the invention, a character processing device that converts an input character formed of an input alphanumeric or symbol to an extended Latin character similar to the input character includes a display unit displaying as an editing character the input character with a cursor attached thereto, a conversion target distinction unit discerning whether or not the editing character is convertible to an extended Latin character, and a notification unit indicating that the editing character is convertible to an extended Latin character when the editing character is regarded as convertible.

According to another aspect of the invention, a character distinction method for converting an input character formed of an input alphanumeric or symbol to an extended Latin character similar to the input character includes displaying as an editing character the input character with a cursor attached thereto, discerning whether or not the editing character is convertible to an extended Latin character, and indicating that the editing character is convertible to an extended Latin character when the editing character is regarded as convertible.

With these configurations, it is discerned whether a character subject to editing (editing character) is convertible to an extended Latin character, and it is indicated that the editing character is convertible if it is. Accordingly, even users who are not familiar with extended Latin characters (users who are little acquainted with extended Latin characters) may easily discern whether an input character is convertible to an extended Latin character. Extended Latin characters mean accented alphabetical characters seen in French or other languages (e.g., alphabetical characters with diacritical marks) and special symbols.

In this case, it is preferable that the conversion target distinction unit discern that the editing character is convertible to an extended Latin character when being a character subject to conversion to an extended Latin character, and that the editing character is inconvertible to an extended Latin character when not being a character subject to conversion.

With this configuration, the editing character is regarded as convertible to an extended Latin character when being a character subject to conversion, and the editing character is regarded as inconvertible to an extended Latin character when not being a character subject to conversion. In other words, it is possible to discern whether the editing character is convertible based on whether the editing character has an extended Latin character corresponding thereto. Characters subject to conversion mean alphabetical characters (e.g., "e") similar (corresponding) to extended Latin characters (e.g., "ë").

In this case, it is preferable that the conversion target distinction unit discern that the editing character is inconvertible to an extended Latin character when the editing character is not a character subject to conversion or is a specified character, if the editing character that is subject to conversion to an extended Latin character is regarded as a specified character with the cursor moved therefrom or the character converted to an extended Latin character.

With this configuration, a character subject to conversion that has been off target for conversion (e.g., a character subject to conversion that has been converted to and specified as an extended Latin character, or a character subject to conversion from which the cursor has moved) is regarded as a specified character, and the editing character is regarded as inconvertible to an extended Latin character if it is not a character subject to conversion or is a specified character. Regarding such characters as characters inconvertible to extended Latin characters may enhance the convenience of users.

In these cases, it is preferable that the character processing device also include a converter that converts the editing character to an extended Latin character based on a conversion operation when the conversion target distinction unit discerns that the editing character is convertible.

With this configuration, the editing character is converted to an extended Latin character based on the conversion operation when the editing character is convertible. This prevents device malfunctions caused by user mishandling because the conversion operation is deactivated with the editing character inconvertible.

In these cases, it is preferable that the notification unit be formed of an indicator that is turned on when the editing character is convertible to an extended Latin character and is turned off when the editing character is inconvertible.

With this configuration, the indicator is turned on when the editing character is convertible, and the indicator is turned off when the editing character is inconvertible (off target for conversion). This allows users to visibly discern whether a target character is a character convertible to an extended Latin character, and facilitates the discernment of whether the character is convertible to an extended Latin character.

In these cases, it is preferable that the character processing device also include a conversion candidate display unit displaying one or more extended Latin characters that are conversion candidates of the character subject to conversion, wherein the conversion candidate display unit displays the extended Latin characters in both lower and upper cases for the conversion candidates corresponding to the character subject to conversion.

With this configuration, conversion candidates corresponding to the character subject to conversion are displayed in both upper and lower cases despite the attribute (uppercase or lowercase) of the character subject to conversion. This makes it possible to provide user-friendly environments.

In this case, it is preferable that the conversion candidate display unit gives preference to the conversion candidates in lower case over the conversion candidates in upper case on the display when the character subject to conversion is lowercase, and that the conversion candidate display unit gives preference to the conversion candidates in upper case over the conversion candidates in lower case on the display when the character subject to conversion is uppercase.

With this configuration, preference is given to the conversion candidates for extended Latin characters in lower case on the display when the character subject to conversion is lowercase, and preference is given to the conversion candidates for extended Latin characters in upper case on the display when the character subject to conversion is uppercase. In general, users psychologically expect that if a character subject to conversion to an extended Latin character is input in lower case, it will be converted to an extended Latin character in lower case, and that if a character subject to conversion to an extended Latin character is input in upper case, it will be converted to an extended Latin character in upper case. Accordingly, preference is given to conversion candidates for extended Latin characters with the same attribute (lowercase or uppercase) as that of the input character subject to conversion on the display, which makes it possible to provide user-friendly environments.

According to yet another aspect of the invention, a computer program features the capability of causing a computer to execute each process of the character distinction method described above.

Using the computer program makes it possible to indicate that an input character is convertible to an extended Latin character.

BRIEF DESCRIPTION OF THE DRAWINGS

The invention will be described with reference to the accompanying drawings, wherein like numbers reference like elements.

DESCRIPTION OF EXEMPLARY EMBODIMENTS

One embodiment of the invention will hereinafter be described in detail with reference to the accompanying drawings. A tape printing device that produces labels by printing on tape-shaped media will be taken for an example of a character processing device to describe the embodiment of the invention.

Figure 1:
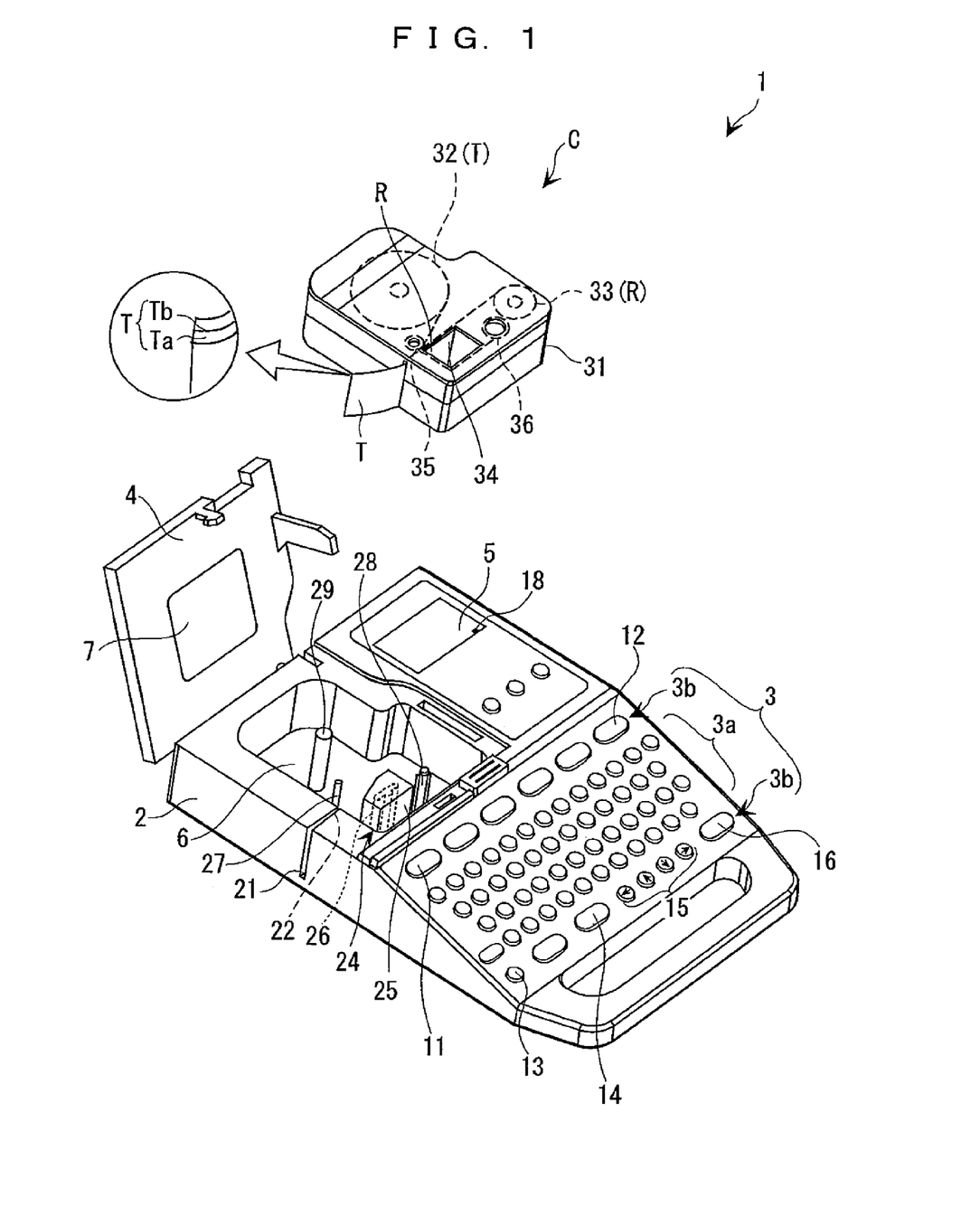
FIG. 1 is a system configuration diagram of a tape printing device according to one embodiment of the invention.

FIG. 1 is an external perspective view of a tape printing device 1 according to the embodiment of the invention with an opening/closing lid 4 open. As shown in FIG. 1, the exterior of the tape printing device 1 is provided by a device case 2; arranged on the front top of the device case 2 is a keyboard 3 (input unit) incorporating various input keys; and disposed on the left-rear and right-rear top thereof are the opening/closing lid 4 and a display screen 5 (display unit) respectively. Inside the opening/closing lid 4, a cartridge holder 6 to install a tape cartridge C in is provided so as to be a depression. With the opening/closing lid 4 open, a tape cartridge C is installed in the cartridge holder 6 so that it may be ejected and re-installed. On the opening/closing lid 4, an observation window 7 is provided to allow for visual checks on tape cartridge C installation with the opening/closing lid 4 closed.

Arranged on the keyboard 3 are a character key group 3a and a function key group 3b used to set various operation modes or the like. The character key group 3a has features common to a keyboard for a regular word processor or the like such as a full-keyboard structure based on the JIS keyboard layout and shift keys to restrain an increase in the number of keys. The function key group 3b includes a Print key 11 to issue a command for printing, a Delete key 12 to delete characters, a Power key 13 to turn ON and OFF the power, an Extended Latin Character Conversion key 14 to convert characters (alphabetical characters) to extended Latin characters 73 described below, cursor keys ("↓", "↑", "←" and "→") 15 to move a cursor and do scrolling, and a Select key 16 to select from a menu, specify a character, and perform other tasks.

The display screen 5 is a liquid crystal display, which is used when users input data with the keyboard 3, create and edit printing data such as character strings (text data) and images, and check on the data result. Disposed at the bottom of the display screen 5 is an area showing an indicator (hereinafter called "extended Latin character conversion indicator 18 [notification unit]") that makes it possible to discern whether a character subject to editing (editing character or character with a cursor K attached thereto) is convertible to an extended Latin character 73. The extended Latin character conversion indicator 18 is turned on when the character is a character subject to conversion 71 that is convertible to an extended Latin character 73; and it is turned off when the character is a character exempt from conversion 72 that is inconvertible. (Characters subject to conversion 71, characters exempt from conversion 72 and extended Latin characters 73 corresponding to characters subject to conversion 71 are detailed in FIGS. 7A and 7B.)

Provided in the left side of the device case 2 is a tape ejecting slot 21 that connects the cartridge holder 6 and outside. Attached to the tape ejecting slot 21 is a tape cutter 22 to cut a printing tape T (tape-shaped material) that is fed out. Fed out of the tape ejecting slot 21 is a given length of the printing tape T that has been printed. With feeding motion stopped briefly, the printing tape T that has been printed is cut by the tape cutter 22 and made into a label. Cutting processes may switch from automatic cutting to manual cutting and vice versa. A cutter motor 23 (see FIG. 2) is driven automatically (in auto mode) for printing in fixed lengths, and manually (in manual mode) by the operation of a Cut key included in the keyboard 3 for printing in random lengths.

The cartridge mounting section 6 includes a head unit 24 having a printhead 26 (printing unit) incorporated therein and formed of a thermal head inside a head cover 25, a platen drive spindle 27 facing the printhead 26, a takeup reel drive spindle 28 to reel in an ink ribbon R described below, and a positioning boss 29 that positions a tape reel 32 described below. Embedded under the cartridge mounting section 6 is a tape feeding motor 30 (see FIG. 2) that rotates the platen drive spindle 27 and takeup reel drive spindle 28.

A tape cartridge C is formed so as to house a tape reel 32 with a printing tape T of a given width (approximately 4.5 to 48 mm) wound therearound in the upper central interior of a cartridge case 31, and a ribbon reel 33 with an ink ribbon R wound therearound in the lower right interior of the cartridge case 31. The printing tape T and ink ribbon R are formed so as to have the same width. A through aperture 34 for inserting to the head cover 25 covering the head unit 24 is formed at the bottom left of the tape reel 32. Arranged according to where the printing tape T and ink ribbon R overlap is a platen roller 35 fitted and driven to rotate on the platen drive spindle 27. Arranged adjacent to the ribbon reel 33 is a ribbon takeup reel 36. The ink ribbon R fed out of the ribbon reel 33 is arranged so as to travel around the head cover 25 to be reeled in onto the ribbon takeup reel 36.

The printing tape T is formed of a recording tape Ta (backing tape) with an adhesive layer on the back and a detachable tape Tb stuck on the recoding tape Ta with the adhesive layer (see FIG. 1). Wound into a roll with the recording tape Ta outside and the detachable tape Tb inside, the printing tape T is contained in the cartridge case 31. The printing tape T comes in a plurality of different tape types (e.g., in different tape widths, tape colors and ink colors), and has in the back of the cartridge case 31 a plurality of holes (not shown) that allow for identification of such tape types. The cartridge holder 6 has a plurality of tape type recognition sensors (microswitches) 37 (see FIG. 2) corresponding to the plural number of holes. The tape type recognition sensors 37 enable identification of tape types by checking on the plural number of holes.

Figure 2:
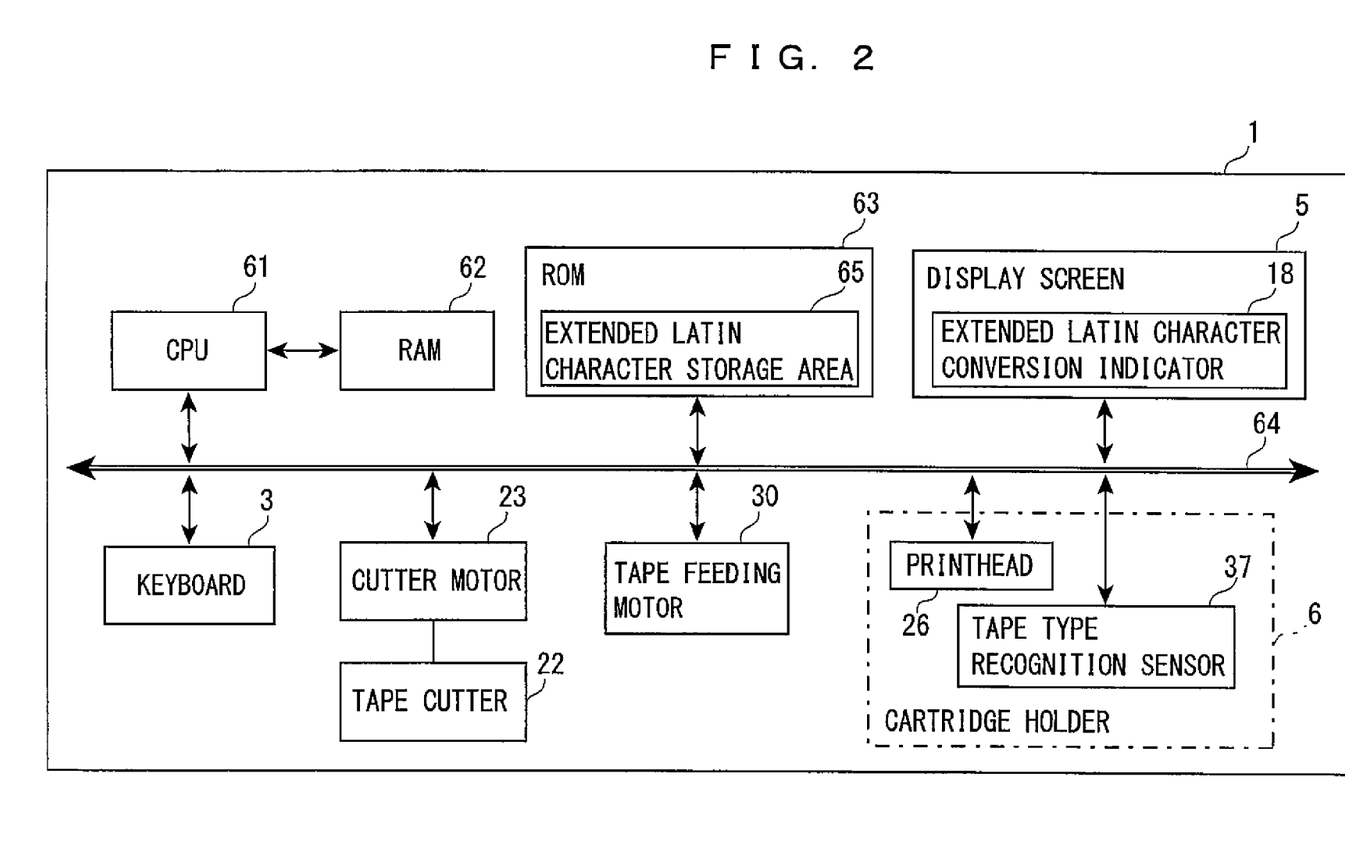
FIG. 2 is a control block diagram for the tape printing device.

Referring to the control block diagram shown in FIG. 2, the control configuration of the tape printing device 1 will be described hereinafter. The tape printing device 1 includes a central processing unit (CPU) 61, a random access memory (RAM) 62, a read only memory (ROM) 63, the keyboard 3, the display screen 5, the extended Latin character conversion indicator 18, the cutter motor 23, the tape cutter 22, the tape feeding motor 30, the printhead 26 and the tape discriminating sensors 37. Some of the above, i.e., the ROM 63, keyboard 3, display screen 5, extended Latin character conversion indicator 18, cutter motor 23, tape feeding motor 30 and printhead 26 are connected with the CPU 61 via buses 64. Connected directly to the RAM 62, the CPU 61 uses the RAM 62 as a work area for exercising various controls.

The ROM 63 stores a control program used for various controls executed by the CPU 61. The ROM 63 also has an extended Latin character storage area 65 storing extended Latin characters 73 corresponding to characters subject to conversion 71 that are convertible to extended Latin characters 73. Included in the control program is an extended Latin character conversion program that discerns whether an editing character (character pointed to by a cursor K) is convertible to an extended Latin character 73, and controls the extended Latin character conversion indicator 18 based on the discernment result.

The extended Latin character conversion indicator 18 indicates by brightening or darkening part of the display screen 5 whether an editing character is convertible. The extended Latin character conversion indicator 18 may use an independent display such as an LED instead of brightening part of the display screen 5.

The cutter motor 23, connected to the tape cutter 22, functions as a cutting unit. The tape feeding motor 30 and printhead 26 function as a printing unit to print on a printing tape T. The printhead 26 and tape discriminating sensors 37 are disposed in the cartridge holder 6 as described above. The tape discriminating sensors 37 detect the type of a printing tape T contained in the tape cartridge C.

Figure 3:
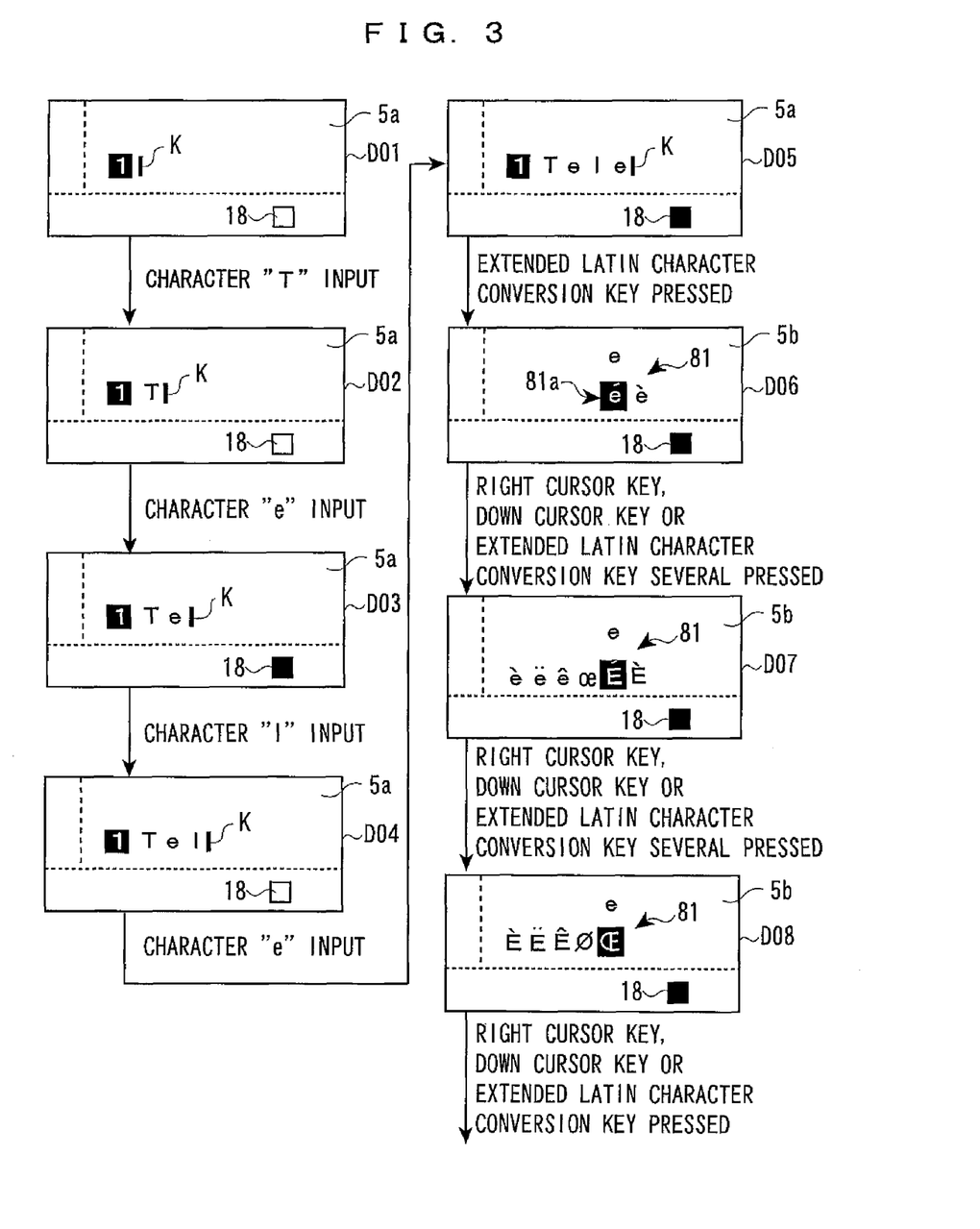
FIG. 3 is a diagram illustrating a sequence of operations that converts target characters to extended Latin characters.
Figure 4:
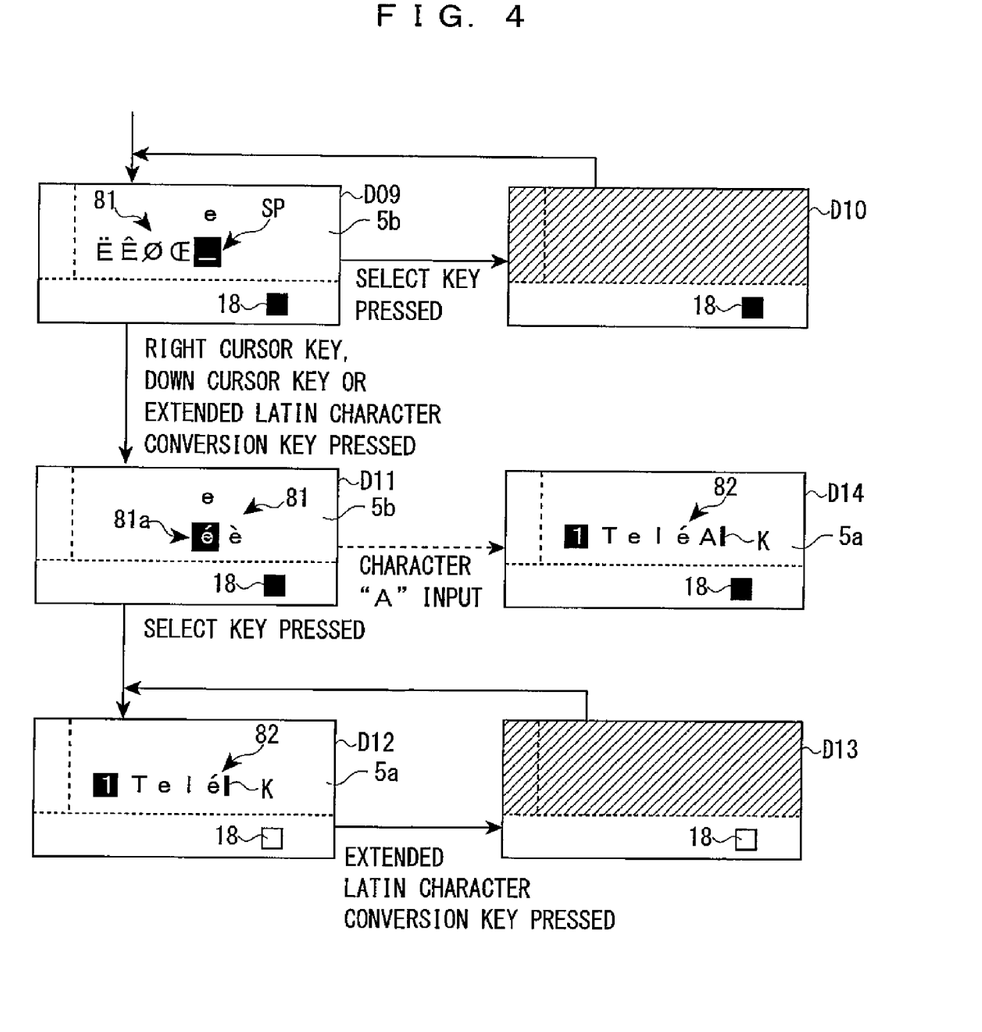
FIG. 4 is a diagram illustrating a sequence of operations that converts target characters to extended Latin characters.

Referring to FIGS. 3 and 4, a sequence of operations that converts target characters to extended Latin characters 73 (character distinction method) will be described hereinafter. In the figures, a white square used for the extended Latin character conversion indicator 18 means it is off, and a black square used therefor means it is on. This is also applicable to FIGS. 5 and 6 described below.

The extended Latin character conversion indicator 18 is turned on when the extended Latin character conversion program described above discerns that an editing character is a character subject to conversion 71 and is convertible to an extended Latin character 73. On the other hand, the extended Latin character conversion indicator 18 is turned off when the extended Latin character conversion program discerns that the character is not a character subject to conversion to an extended Latin character 73 (a character exempt from conversion 72) or that a character subject to conversion 71 is a specified character (e.g., a character subject to conversion 71 that has been off target for editing as a result of the move of the cursor K, or a character subject to conversion 71 that has been converted to and specified as an extended Latin character 73). Accordingly, characters exempt from conversion 72 and characters subject to conversion 71 that have been off target for editing as specified characters are regarded as characters inconvertible to extended Latin characters 73, which may enhance the convenience of users.

As shown in FIG. 3, a character input screen 5a (display screen 5) is displayed (D01) when the tape printing device 1 is turned ON by a user. In this case, the extended Latin character conversion indicator 18 is off. When a character "T" is input (input character) under this situation (D01), the tape printing device 1 displays on the character input screen 5a a character "T" with a cursor K attached thereto (editing character) (D02). In this case, the tape printing device 1, based on the list of extended Latin characters 73 shown in FIG. 7B, discerns that the character "T" is a character exempt from conversion 72 (a character that is not a character subject to conversion 71) (conversion target distinction unit), and does not turn on the extended Latin character conversion indicator 18.

When a character "e" is input next, the tape printing device 1 discerns that the character "e" is a character subject to conversion 71, and turns on the extended Latin character conversion indicator 18 (D03). Since the character "e" has never been converted to an extended Latin character 73 and the cursor K has never been moved away from the character "e," the tape printing device 1 discerns that the character "e"

is a character subject to conversion 71 that is convertible to an extended Latin character 73 (conversion target distinction unit).

When a character "l" is input without the Extended Latin Character Conversion key 14 pressed under this situation (D03), the tape printing device 1 discerns that the character "e" is a specified character and that the character "l" that has been input is a character exempt from conversion 72, and turns off the extended Latin character conversion indicator 18 (D04). When another character "e" is input, the tape printing device 1 discerns that the character "e" is a character subject to conversion 71 (a character subject to conversion 71 that is convertible), and turns on the extended Latin character conversion indicator 18 (D05).

With the Extended Latin Character Conversion key 14 pressed under this situation (D05), the tape printing device 1 calls conversion candidates 81 related to the character "e" out of the extended Latin character storage area 65, and displays them on a conversion candidate selection screen 5b (display screen 5) (D06, conversion candidate display unit) Since the character "e" subject to conversion has been input in lower case, the tape printing device 1 gives preference to conversion candidates 81 in lower case on the display (displays conversion candidates 81 in lower case before conversion candidates 81 in upper case), and highlights the first conversion candidate 81a. The extended Latin character conversion indicator 18 is kept on.

With a cursor key 15 ("→" or "↓") or the Extended Latin Character Conversion key 14 several pressed under this situation (D06), the tape printing device 1 displays one of the other conversion candidates 81 after another. At this moment, the conversion candidates 81 in lower case are followed by the conversion candidates 81 in upper case on the display (D07, D08). In other words, conversion candidates 81 in both upper and lower cases corresponding to the character subject to conversion are displayed despite the attribute (uppercase or lowercase) of the character subject to conversion. At this moment, the extended Latin character conversion indicator 18 is also on. Accordingly, not only are conversion candidates 81 with the attribute identical with or different from that of a character subject to conversion (lowercase or uppercase) displayed, but preference is given to conversion candidates 81 for extended Latin characters 73 with the same attribute as that of the character subject to conversion on the display, which makes it possible to provide user-friendly environments.

With the above keystrokes used, a space SP ("_") indicating the last conversion candidate 81 is highlighted (D09) With the Select key 16 pressed under this situation, the tape printing device 1 gives an alert to a user by graying the screen out (D10), and returns to the last screen D09. With the space SP ("_") highlighted, the press of the cursor key 15 ("→" or "↓") or Extended Latin Character Conversion key 14 results in the return to the first (81a) of the conversion candidates 81 (D11).

With the Select key 16 pressed under this situation (D11), the tape printing device 1 specifies the conversion candidate 81a that has been selected (highlighted), and displays the character 82 replacing the character "e" on the character input screen 5a (D12, converter). At this moment, the tape printing device 1 discerns that the character "e" is a specified character, and turns off the extended Latin character conversion indicator 18. When the Extended Latin Character Conversion key 14 is pressed again with the screen D12 displayed, the tape printing device 1 gives an alert by graying the screen out to notify a user that the target character 82 is off target for conversion (inconvertible) (D13) because the target character 82 is regarded as a specified character, returning to the last screen D12.

When the Delete key 12 is pressed with the screen D06 displayed, the tape printing device 1 cancels the display of conversion candidates 81 and returns to the last document input screen (D05). When another character (e.g., a character "A") is instead input without the Select key 16 pressed with the screen D11 displayed, the tape printing device 1 displays the character 82 replacing the character "e" followed by a character "A" on the character input screen 5a (D14). In this case, the extended Latin character conversion indicator 18 is on because the character "A" is regarded as a character subject to conversion 71 that is convertible. When a character exempt from conversion 72 (e.g., a character "P") is input instead of a character "A," the extended Latin character conversion indicator 18 is turned off.

Figure 5:
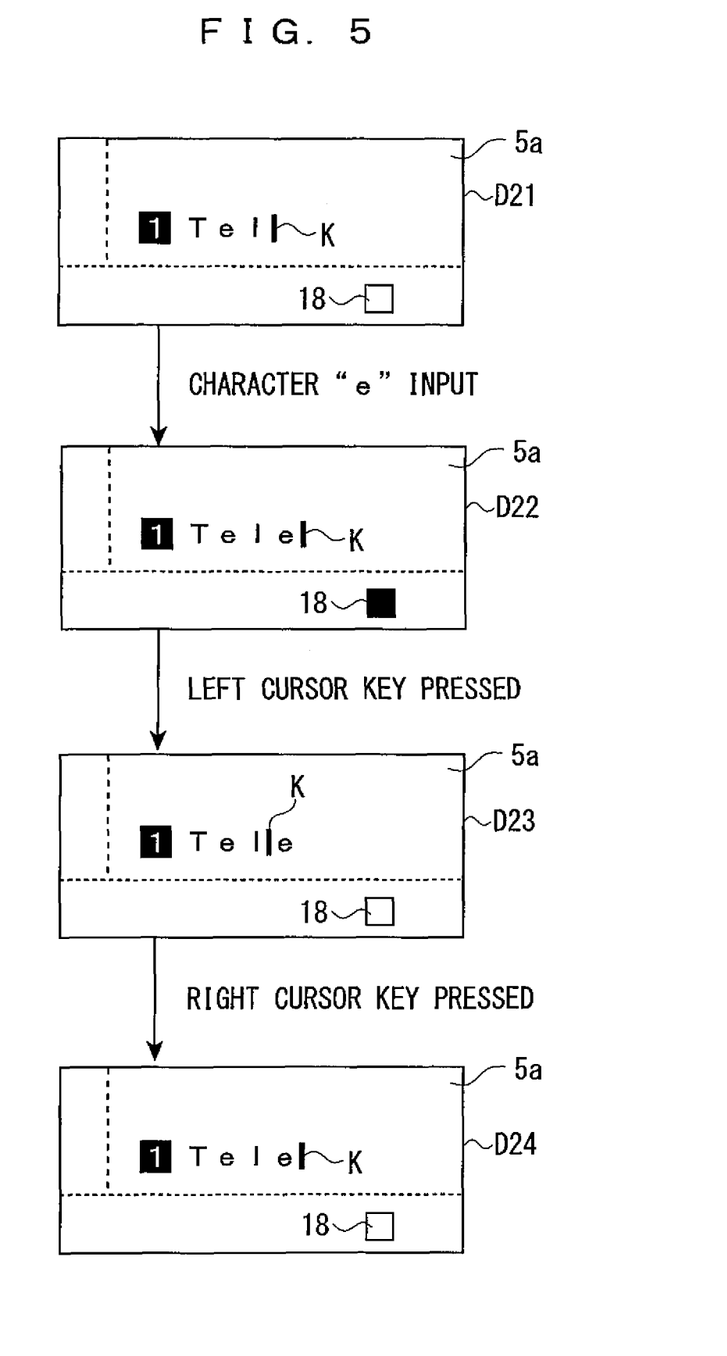
FIG. 5 is a diagram illustrating the status change (on/off) of an extended Latin character conversion indicator that results from the move of a cursor.

Referring to FIG. 5, the status change (on/off) of the extended Latin character conversion indicator 18 that results from the move of the cursor K will be described hereinafter. When a character "e" is input with a user-input character string "Tel" displayed (D21), the tape printing device 1 not only displays a character string "Tele" on the character input screen 5a but discerns that the character "e" is a character subject to conversion 71 that is convertible, turning on the extended Latin character conversion indicator 18 (D22). At this moment, the cursor K points to the character "e".

When the left cursor key 15 ("←") is pressed, the tape printing device 1 moves the cursor K one character to the left to point it to the character "l" (D23). At this moment, the tape printing device 1 discerns that the character "l" is a character exempt from conversion 72, and turns off the extended Latin character conversion indicator 18.

When the right cursor key 15 ("→") is pressed, the tape printing device 1 moves the cursor K one character to the right to point it to the character "e" (D24). Since the character "e" has been off target for editing (conversion) as a result of the move of the cursor K in this case, the tape printing device 1 discerns that the character "e" is a specified character (a character subject to conversion 71 that has been off target for conversion). Accordingly, the tape printing device 1 does not turn on the extended Latin character conversion indicator 18 (keeps the extended Latin character conversion indicator 18 off).

Figure 6:
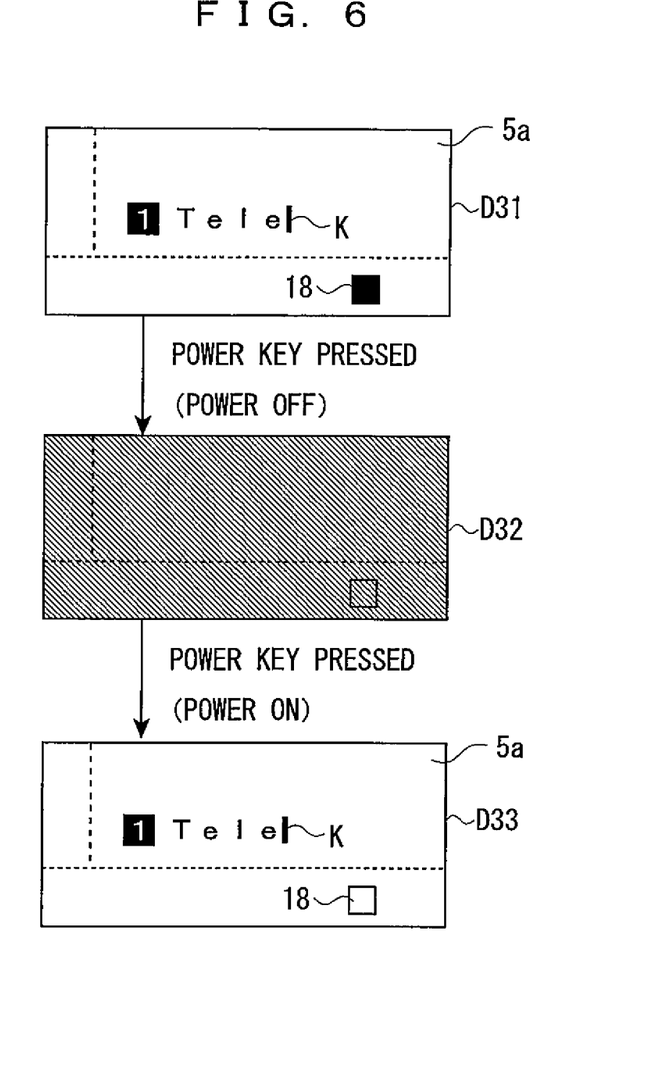
FIG. 6 is a diagram illustrating the status change of the extended Latin character conversion indicator with the tape printing device turned ON and OFF.

Referring to FIG. 6, the status change of the extended Latin character conversion indicator 18 with the tape printing device 1 turned OFF during character input processes will be described hereinafter. When a user inputs characters "T," "e," "l" and "e" in turn, the tape printing device 1 not only displays a character string "Tele" on the character input screen 5a but discerns that the character "e" input at the end is a character subject to conversion 71 that is convertible, and turns on the extended Latin character conversion indicator 18 (D31). When the tape printing device 1 is turned OFF with the Power key 13 pressed, the tape printing device 1 specifies the character "e" before turning OFF itself (D32).

When the tape printing device 1 is turned ON with the Power key 13 pressed again, the tape printing device 1 displays the character input screen 5a that had been displayed before the power was turned OFF (D33). Since the character "e" has been specified at this moment, the tape printing device 1 discerns that the character "e" is off target for conversion, and turns off the extended Latin character conversion indicator 18. Turned ON again after turned OFF during the display of conversion candidates 81 corresponding to the character "e" (with the extended Latin character conversion indicator 18 on), the tape printing device 1 discerns that the character "e" is off target for conversion, and turns off the extended Latin character conversion indicator 18, as described above.

According to the embodiment of the invention as described above, when a character subject to editing (editing character) is convertible to an extended Latin character 73, that is indicated with the extended Latin character conversion indicator 18 on, and the character is converted to an extended Latin character 73 based on the conversion operation. Accordingly, even users who are not familiar with extended Latin characters 73 (users who are little acquainted with extended Latin characters 73) may easily discern whether target characters are convertible to extended Latin characters 73 (whether target characters are characters that are convertible to extended Latin characters 73).

According to the embodiment of the invention, a target character that is a character subject to conversion 71 but has been off target for editing (has been a specified character) is no longer allowed to be converted to an extended Latin character 73 (when the character has been converted to and specified as an extended Latin character 73 or when the cursor K has left the character, for example). Instead, conversion to an extended Latin character 73 may be allowed to be carried out repeatedly if a target character is a character subject to conversion 71. A target character that has been converted to and specified as an extended Latin character 73 may also be allowed to be converted to another extended Latin character 73 until the cursor K is moved. The extended Latin character conversion indicator 18 is turned on whenever a target character is convertible to an extended Latin character 73.

According to the embodiment of the invention, conversion candidates 81 for extended Latin characters 73 are always displayed in the same order, beginning with the first of the conversion candidates 81. However, with a learning function to learn results of conversion to extended Latin characters 73 incorporated, for example, conversion candidates 81 may be displayed based on the learning results.

According to the embodiment of the invention, visual notification of whether a target character is convertible to an extended Latin character 73 is provided with the extended Latin character conversion indicator 18 turned on or off. Instead, such notification may be provided with a target character decorated or aural notification may be provided with electronic sounds.

Figure 7A:
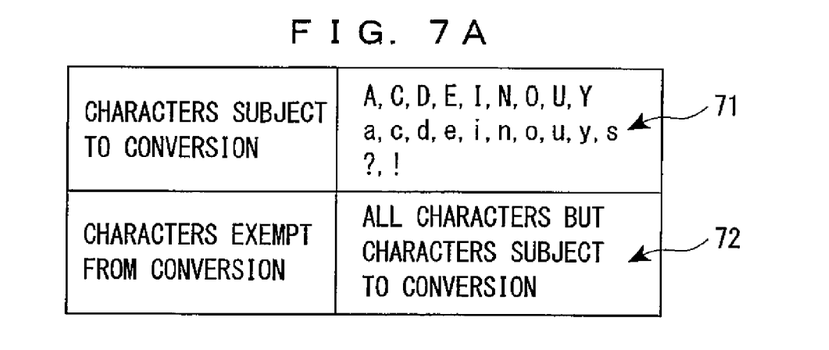
FIGS. 7A and 7B are diagrams illustrating an example of characters subject to conversion, characters exempt from conversion and extended Latin characters corresponding to characters subject to conversion.
Figure 7B:
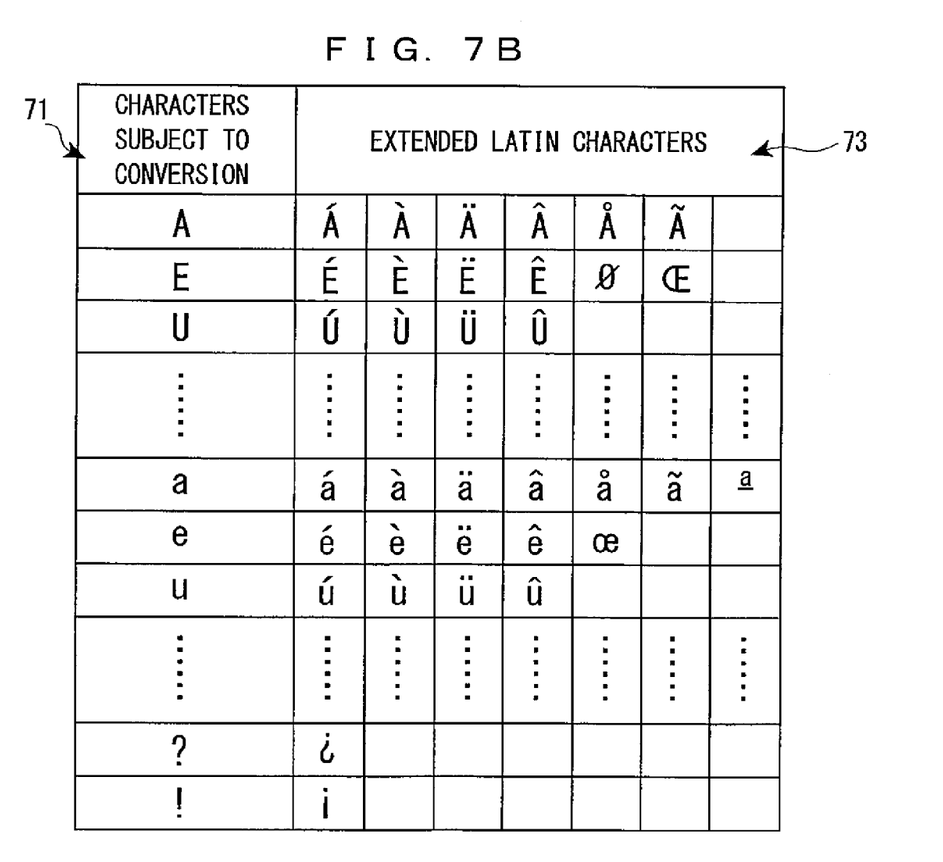

The characters subject to conversion 71, characters exempt from conversion 72 and extended Latin characters 73 shown in FIGS. 7A and 7B are exemplary and do not limit the invention.

Each process of the character distinction method for the tape printing device 1 shown in the foregoing embodiment of the invention may be provided as a computer program that is executed by a computer. Such a computer program may be provided in a storage medium (not shown). As storage media, CD-ROM, flash ROM, memory cards (e.g., CompactFlash [registered trademark], SmartMedia, Memory Stick), Compact Discs, magneto-optical disks, digital versatile discs, flexible disks or other storage media may be used.

Despite the above embodiment of the invention, appropriate changes and modifications to the device configuration of the tape printing device 1, the processes including the method of conversion to extended Latin characters and other part of the embodiment may be made without deviating from the scope of the invention.

What is claimed is:

1. A character processing device that converts an input character formed of an input alphanumeric or symbol to an extended Latin character similar to the input character, the character processing device comprising:
a display unit displaying as an editing character the input character with a cursor attached thereto;
a conversion target distinction unit discerning whether or not the editing character is convertible to the extended Latin character; and
a notification unit indicating that the editing character is convertible to the extended Latin character when the editing character is regarded as convertible,
wherein the notification unit is formed of an indicator that is turned on when the editing character is convertible to the extended Latin character, and is turned off when the editing character is inconvertible.

2. The character processing device according to claim 1, wherein the conversion target distinction unit discerns that the editing character is convertible to the extended Latin character when the editing character is a character subject to conversion to the extended Latin character, and that the editing character is inconvertible to the extended Latin character when the editing character is not the character subject to conversion.

3. The character processing device according to claim 2, further comprising:
a conversion candidate display unit displaying one or more of the extended Latin characters that are conversion candidates of the character subject to conversion, wherein the conversion candidate display unit displays the extended Latin characters in both lower and upper cases for the conversion candidates corresponding to the character subject to conversion.

4. The character processing device according to claim 3, wherein the conversion candidate display unit gives preference to the conversion candidates in lower case over the conversion candidates in upper case on the display when the character subject to conversion is lowercase, and the conversion candidate display unit gives preference to the conversion candidates in upper case over the conversion candidates in lower case on the display when the character subject to conversion is uppercase.

5. The character processing device according to claim 1, wherein the conversion target distinction unit discerns that the editing character is inconvertible to the extended Latin character when the editing character is not the character subject to conversion or is a specified character, if the editing character that is subject to conversion to the extended Latin character is regarded as a specified character with the cursor moved therefrom or with the character converted to the extended Latin character.

6. The character processing device according to claim 1 further comprising:
a converter that converts the editing character to the extended Latin character based on a conversion operation when the conversion target distinction unit discerns that the editing character is convertible.

7. A character distinction method for converting an input character formed of an input alphanumeric or symbol to an extended Latin character similar to the input character, the character distinction method comprising:
displaying as an editing character the input character with a cursor attached thereto;
discerning whether or not the editing character is convertible to the extended Latin character; and
indicating that the editing character is convertible to the extended Latin character when the editing character is regarded as convertible, by use of an indicator that is turned on when the editing character is convertible to the extended Latin character, and is turned off when the editing character is inconvertible.

8. A non-transitory computer-readable medium encoded with a computer program that causes a computer to execute each process of the character distinction method set forth in claim 7.

* * * * *